Sept. 12, 1961   R. E. McGINNIS   2,999,669
DAMPING APPARATUS
Filed Nov. 21, 1958

INVENTOR
RALPH E. McGINNIS
BY

United States Patent Office 2,999,669
Patented Sept. 12, 1961

2,999,669
DAMPING APPARATUS
Ralph E. McGinnis, Folsom, Pa., assignor to Westinghouse Electric Corporation, East Pittsburgh, Pa., a corporation of Pennsylvania
Filed Nov. 21, 1958, Ser. No. 775,448
8 Claims. (Cl. 253—77)

This invention relates to damping apparatus and more particularly to means for damping the vibrations in the blades of turbines, compressors and the like.

The majority of operational blade failures are of the fatigue type and are attributable to insufficiently damped blade vibrations. It is desirable, therefore, to supplement the damping that is inherently available in blades by means of a vibration damper. It is also desirable that the damper be efficient, inexpensive to make and install, and capable of performing its function without introducing windage losses or disturbing the flow of fluid over the blading.

Rotor blades of the above type include an elongated vane portion of substantially airfoil cross section. According to the present invention, a rotor blade is provided with damping means comprising a longitudinal series of plates disposed within and alternately snugly fitting and loosely fitting a longitudinally extending cavity in the vane portion.

In one embodiment of this invention, the plates are in stacked relationship so that juxtaposed, broad surfaces of the plates are in mutual contact. In another embodiment, the snugly fitting plates are maintained spaced apart a distance greater than the thickness of the loosely fitting plates, in order that centrifugal forces of the entire series of plates will not accumulate and produce an excessive force normal to those contacting plate surfaces adjacent the tip of the vane portion. The latter embodiment is preferred in high speed apparatus where high centrifugal forces are produced.

In both embodiments, a blade vibration damper is provided which has the desirable characteristics mentioned previously. The component parts are inexpensive to make, easy to assembly and install, and they are arranged internally of the contoured vane surfaces. From the standpoint of damping efficiency, the damper disclosed herein is highly effective for the small volume it occupies, since the transverse movement of each loosely fitting plate during vibration accomplishes impact damping, as well as friction damping. The snugly fitting plates also function efficiently, since they accomplish friction damping through sliding contact with the loosely fitting plates, and the cavity wall as well.

The various objects, features and advantages of the invention will appear more fully from the detailed description which follows, taken in connection with the accompanying drawing, forming a part of this application in which.

Figure 1:
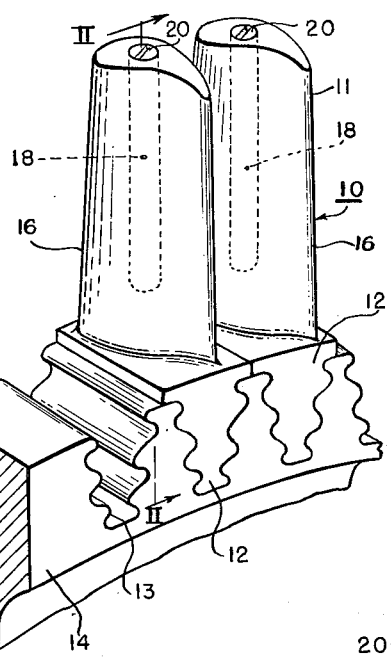
FIG. 1 is a perspective view of a peripheral portion of a rotor disc having mounted thereon a plurality of blades which embody the invention.

Referring to the drawing in detail, there is shown a rotor blade 10 of the type used in compressors, turbines and the like. As best illustrated in FIG. 1, the blade 10 has a tip 11 and a root 12, the latter serving to anchor the blade to a rotor disc 14 for rotation about a remotely located axis of the rotor (not shown). The root 12 shown is of the so-called axially-serrated, side-entry type, but may have any suitable shape, and is adapted to fit in a similarly shaped slot 13 in the disc 14. Extending radially outward from the root 12, and connected thereto, is an elongated vane 16 which is of substantially airfoil cross-sectional shape and, therefore, may be of the impulse or reaction type.

The vane 16 is provided with a cavity 18 extending longitudinally thereof and defined by an interior wall 19 that is generally tubular, but preferably cylindrical for manufacturing convenience. As shown, the cavity 18 extends from the blade tip 11 toward the root 12 in a direction that is substantially radial with respect to the rotational axis.

Figure 2:
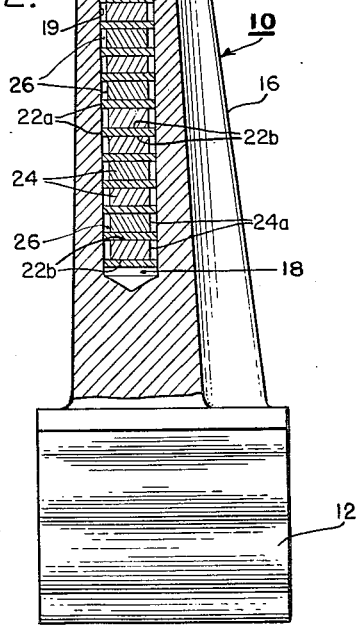
FIG. 2 is a sectional view of a blade, taken along line II—II of FIG. 1 and showing one form of the invention.
Figure 3:
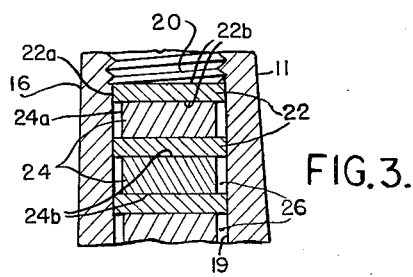
FIG. 3 is an enlarged fragmentary view of a portion of the blade shown in FIG. 2.

Referring now to FIGS. 2 and 3, wherein one form of the invention is illustrated, the cavity 18 has disposed therein a multiplicity of discs or plates which are stacked face-to-face in a longitudinal series along the length of the cavity. These plates alternately snugly fit and loosely fit the cavity 18 and are designated by the numerals 22 and 24, respectively. The edge configuration of the snugly fitting plates 22 is preferably the same shape as the cross-sectional configuration of the cavity wall. To seal the cavity 18 and hold the plates therein a plug 20 is threaded into the entrance of the cavity.

The radial clearance between the cavity wall 19 and the edges 22a of the snugly fitting plates 22 preferably lies in the range of between 0.0001 and 0.001 inch; and the radial clearance between the cavity wall and the edges 24a of the loosely fitting plates 24 is greater than .002 inch. Since one loosely fitting plate 24 is disposed between each pair of snugly fitting plates 22, the plates 22 are maintained spaced apart a distance equal to the thickness of the plate 24 between them, thus dividing or partitioning the cavity into a series of compartments 26 for the respective plates 24 along teh length of the cavity 18.

The broad surfaces of the snugly fitting plates 22 are each designated by the numeral 22b and the broad surfaces of the loosely fitting plates are each designated by the numeral 24b.

During operation of the rotor, the blade 10 will vibrate when, for example, its fundamental frequency is in resonance with vibratory exciting forces caused by well-known disturbances. Under such conditions, a blade, such as that illustrated, will flex about an axis that is at or adjacent the root end of the vane 16 and transverse to the longitudinal axis of the blade, the greatest transverse deflections of the vane being experienced at the tip or radially outermost end thereof. When the vibrating blade 10 flexes back and forth, the cavity wall 19 is distorted from its original cylindrical shape and the stacked plates 22 and 24, now bearing against the plug 20 under the radially outward thrust of centrifugal forces, are moved. And, while the snugly fitting plates 22 oppose such movement and damp the blade vibration by sliding frictional contact between their edge surfaces 22a and the cavity wall 19, the loosely fitting plates 24 slide back and forth independently of each other, oscillating transversely of the longitudinal axis of the blade 10, and damp vibration in two ways: by frictional contact of the juxtaposed, mutually-facing, broad surfaces 22b and 24b of the plates 22 and 24 with one another, and by impact of edges 24a of the plates 24 with transversely opposed surfaces of the cavity wall 19.

Figure 4:
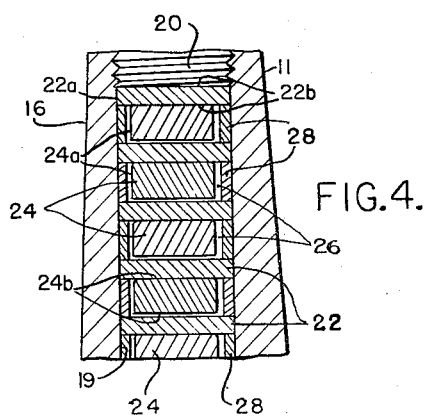
FIG. 4 is a view similar to FIG. 3 showing the invention in modified form.

A modified form of the invention is illustrated in FIG. 4 wherein like reference numerals are used to designate parts similar to that of FIG. 3. In this embodiment, however, neighboring pairs of snugly fitting plates 22 are spaced apart a greater distance than the thickness of the loosely fitting plate 24 between them and they are maintained in such spaced relation by means of a tubular spacer element 28. The spacer element 28 is preferably cylindrical and has a greater dimension in the longitudinal direction of the blade 10 than the loosely fitting plate 24 it surrounds.

The spacer elements 28 permit each loosely fitting plate 24 to press against the neighboring snugly fitting plate 22 disposed radially outwardly thereof with the centrifugal force of its own mass alone, as shown, and without the added force of those plates disposed radially inwardly thereof. In effect the combined centrifugal force of each snugly fitting plate 22 and the loosely fitting plate 24 bearing against it is shunted, around the loosely fitting plate disposed radially outwardly thereof, through the spacer element 28 and marginal portions of the snugly fitting plates 22 to the plug 20.

The arrangement of FIG. 4 is preferred for use in high speed rotary apparatus, where it is desirable for each of the radially outermost, snugly fitting plates 22 and one respective loosely fitting plate 24 to be pressed together with the centrifugal force of the loosely fitting plate alone.

While the invention has been shown in several forms, it will be obvious to those skilled in the art that it is not so limited, but is susceptible of various other changes and modifications without departing from the spirit thereof.

What is claimed is:

1. A blade including an elongated vane portion of substantially airfoil cross section, said vane portion having an interior wall including opposed surface portions defining a longitudinally extending cavity therein, a plurality of plates snugly fitted within said cavity and arranged in spaced relation to each other so as to divide the cavity into a series of chambers along at least part of the length of said cavity, and a member loosely disposed in each chamber and loosely fitted with respect to said wall so as to be independently movable back and forth into and out of contact with the opposed surface portions of said interior wall.

2. A rotor blade including an elongated vane portion of substantially airfoil cross section, said vane portion having an interior wall defining a cavity therein extending longitudinally of said vane portion, a plurality of plates snugly fitted within said cavity and arranged in spaced relation to each other so as to partition the cavity into a series of chambers extending longitudinally along at least part of the length of said cavity, and a member loosely disposed in each chamber and loosely fitted with respect to said wall, each member having one surface thereof contacting at least one surface of the plates neighboring it, said members each being capable of independent motion toward and away from said wall, whereby said plates provide friction damping and said members provide both friction and impact damping when the blade vibrates.

3. A rotor blade including an elongated vane portion of substantially airfoil cross section, said vane portion having a cylindrical interior wall defining a longitudinally extending cavity therein, a plurality of discs snugly fitted within said cavity, means for maintaining said discs in spaced relation to each other so as to divide said cavity into a series of chambers along the length of said cavity, the radial clearance between said wall and said discs lying in the range of between 0.0001 and 0.001 inch, and a member loosely disposed in each chamber and loosely fitted with respect to said wall, the clearance between said wall and said members being greater than 0.002 inch, one surface of each member being in contact with at least one surface of the discs neighboring it, and each of said members being capable of independent transverse motion with respect to the longitudinal axis of said vane, whereby said discs provide friction damping, said members provide impact damping, and said members and said discs cooperate to provide friction damping when the blade vibrates.

4. A rotor blade comprising an elongated vane having a tip at one end and a root connected to the other end, said vane having a substantially airfoil cross section and an interior wall defining a longitudinally extending cavity therein, a plurality of plates snugly fitted within said cavity, means including a spacer element for maintaining adjacent plates in spaced relation to each other so as to divide said cavity into a series of chambers extending longitudinally of said vane portion, and a member disposed in each chamber and loosely fitted with respect to said wall so as to be independently movable in a direction transverse to the longitudinal extent of said vane, said means spacing apart said plates a distance greater than the thickness of the member disposed between them.

5. A rotor blade including an elongated vane portion of substantially airfoil cross section, said vane portion having an interior wall including opposed surface portions defining a longitudinally extending cavity therein, a plurality of plates snugly fitted within said cavity and arranged in spaced relation to each other so as to partition said cavity into a series of chambers along the length of said cavity, and a member for each chamber loosely disposed therein in contact with said plates and loosely fitted with respect to said wall so as to be independently movable in a direction transverse to the longitudinal extent of said vane portion back and forth into alternating contact with the opposed surface portions of said interior wall, said plate and said members being stacked in face-to-face relationship.

6. Vibration damping means for, and in combination with, a rotor blade that is adapted to be rotatable about a remote axis, said blade including a root portion and an elongated vane portion connected to said root portion, said blade having an interior wall defining an elongated cavity at least in the vane portion thereof which extends in a substantially radial direction with respect to said axis, said damping means comprising a plurality of plates disposed in said cavity, each of said plates having an edge surface and a pair of oppositely facing broad surfaces, one broad surface of at least one plate being in contact with one broad surface of at least one other plate in a plane normal to said radial direction, said one plate being disposed further away from said root portion than said other plate, said one plate snugly fitting said cavity and said other plate loosely fitting said cavity so as to be capable of independent oscillatory movement in said cavity in a direction transverse to the radial extent of said cavity.

7. Vibration damping means for, and in combination with, a rotor blade that is adapted to be rotatable about a remote axis, said blade including a root portion and an elongated vane portion extending radially with respect to said axis and connected to said root portion, said blade having an elongated cylindrical cavity at least in the vane portion thereof which extends in a substantially radial direction with respect to said axis, said damping means comprising a multiplicity of discs stacked in series within said cavity along the length thereof, said discs having juxtaposed surfaces in contact, said series of discs alternately snugly fitting said cavity and loosely fitting said cavity, whereby said snugly fitting plates provide friction damping, said loosely fitting plates being capable of independent oscillatory movement transverse to the radial extent of said vane portion so as to provide impact damping, and said snugly fitting plates and said loosely fitting plates cooperate to provide friction damping when the blade vibrates.

8. Vibration damping means for, and in combination with, a rotor blade that is adapted to be rotatable about a remote axis, said blade including a root portion and an elongated vane portion which extends in a substantially radial direction with respect to said axis and is connected to said root portion, said blade having an elongated cavity at least in the vane portion thereof which extends in a substantially radial direction with respect to said axis, said damping means comprising a multiplicity of plates arranged in series within said cavity along the length thereof, said plates alternately snugly fitting said cavity and loosely fitting said cavity, and means for maintaining said snugly fitting plates in spaced relationship to each other a radial distance greater than the thickness of said loosely fitting plates; said loosely fitting plates being independently movable in a direction transverse to the radial extent of said vane portion.

References Cited in the file of this patent

UNITED STATES PATENTS

| | | |
|---|---|---|
| 1,528,814 | Church | Mar. 10, 1925 |
| 1,833,754 | Paget | Nov. 24, 1931 |
| 1,856,820 | Robinson | Mar. 3, 1932 |
| 2,843,354 | Smith | July 15, 1958 |

FOREIGN PATENTS

| | | |
|---|---|---|
| 981,599 | France | Jan. 17, 1951 |